United States Patent
Rigas et al.

(10) Patent No.: US 7,147,818 B1
(45) Date of Patent: Dec. 12, 2006

(54) PROCESS AND APPARATUS FOR IMPROVED COMPOSITE FIBER VOLUME FRACTION AND DIMENSIONAL STABILITY BY REMOVAL OF ACCUMULATED EXCESS RESIN USING THE VACUUM ASSISTED RESIN TRANSFER MOLDING (VARTM) PROCESS

(75) Inventors: Elias J. Rigas, Newark, DE (US); Thomas J. Mulkern, Baltimore, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 389 days.

(21) Appl. No.: 10/146,055

(22) Filed: May 16, 2002

(51) Int. Cl.
*B29C 70/44* (2006.01)
(52) U.S. Cl. ............ 264/510; 264/102; 264/257; 264/258; 264/511; 264/324
(58) Field of Classification Search ........... 264/510, 264/511, 512, 571, 257, 258, 101, 102, 324
See application file for complete search history.

(56) References Cited

U.S. PATENT DOCUMENTS

| | | | |
|---|---|---|---|
| 6,270,603 B1* | 8/2001 | Westerman et al. ............ 156/94 |
| 6,558,608 B1* | 5/2003 | Haraldsson et al. ........ 264/516 |
| 6,586,054 B1* | 7/2003 | Walsh ...................... 427/430.1 |
| 2002/0020934 A1* | 2/2002 | Hinz ......................... 264/40.6 |
| 2002/0022422 A1* | 2/2002 | Waldrop, III et al. ....... 442/179 |

* cited by examiner

*Primary Examiner*—Stefan Staicovici
(74) *Attorney, Agent, or Firm*—Edward L. Stolarun; William V. Adams; Guy M. Miller

(57) ABSTRACT

A vacuum assisted resin transfer molding (VARTM) process wherein a preform, release film, distribution medium layer, resin inlet(s), vacuum outlet(s), and vacuum bag(s) are positioned on a mold. After the resin has fully impregnated the preform by a vacuum process, the resin feed source is closed and a vacuum crossover line is opened. The resin inlet(s) are then used as a vacuum source to continue the process of removal of the excess resin. Further, secondary vacuum outlets may be placed on the preform to aid in the removal of excess resin after resin impregnation. This imposes a uniform vacuum pressure across the preform to improve the structural characteristics such as the fiber volume fraction and the compaction of the wetted preform over the conventional VARTM process.

7 Claims, 4 Drawing Sheets

US 7,147,818 B1

PROCESS AND APPARATUS FOR IMPROVED COMPOSITE FIBER VOLUME FRACTION AND DIMENSIONAL STABILITY BY REMOVAL OF ACCUMULATED EXCESS RESIN USING THE VACUUM ASSISTED RESIN TRANSFER MOLDING (VARTM) PROCESS

CROSS-REFERENCES TO RELATED PATENT APPLICATIONS

The patent application Ser. No. 10/146,054 filed May 16, 2002 by inventor Elias J. Rigas entitled "A PROCESS FOR IMPROVED COMPOSITE FIBER VOLUME FRACTION AND DIMENSIONAL STABILITY USING A MODULAR TOOL IN THE VACUUM ASSISTED RESIN TRANSFER MOLDING (VARTM) PROCESS" provides other features to the present invention.

STATEMENT REGARDING FEDERALLY SPONSORED RESEARCH OR DEVELOPMENT

The invention described herein may be manufactured, used and/or licensed by or for the United States Government.

BACKGROUND OF THE INVENTION

1. Field of the Invention

The present invention relates to a resin transfer molding process and apparatus, and, in particular, relates to the vacuum assisted resin transfer molding (VARTM) process and apparatus, and further relates to the manufacturing of fiber reinforced resin composite structures, components, and devices therefrom.

2. Description of Related Art

The vacuum assisted resin transfer (VARTM) process and apparatus associated with the present invention provide a low cost organic matrix fiber reinforced composite manufacturing process for constructing structures, components, and devices therefrom.

In the VARTM process, a tool or mold is constructed having a desired shape, for example, with a female mold as may be used in making panels, boat hulls, etc. The mold normally has a single side upon which a preform is placed. The preform may be a combination of one or more layers of mat and/or cloth fabric material, cut in a desired pattern, stacked to a desired depth, and placed on the tool or mold. The fabric material may be composed of glass fibers, carbon graphite fibers, aramid fibers and the like. A release film being conventional and pervious to the selected resin is applied over the preform to ease the separation of the vacuum bag and the preform after the resin has been cured. The mold itself may be Teflon coated or may be coated with a wax or release agent to allow ease of separation of the cured product therefrom. Typically, a conventional distribution medium layer is placed on the release film and provides for a uniform flow of resin into the preform to reduce the formation of voids and other defects which may cause delamination or other structural imperfections. The distribution medium layer may be a non-swelling, non-resin absorptive, open weave fabric knitted to provide a network of close, adjoining or communicating openings, both in the vertical direction and horizontal directions. The resin from the resin source is drawn into the preform assembly by vacuum through flexible tubing. The tubing end may be directly connected into the vacuum bag, acting as a point source, or may be connected into a distribution device such as a coil spring or channel, acting as a line source, to assist in the delivery of the resin to the distribution medium. The vacuum outlets may similarly be connected into the preform assembly as the resin inlets. The resin inlets and vacuum outlets are typically placed on "opposing sides" of the preform since the vacuum draws the resin across and into the preform. As determined by the shape and size of the preform and resin viscosity, resin inlets being either a point or line source and vacuum outlets being either a point or a line source are positioned about the preform so as to insure that all areas of the preform are fully saturated. External resin reservoir(s), a feed source, and a vacuum system are connected by lines such as plastic tubing to the appropriate points and/or lines. The vacuum bag or bags are placed over the above items and sealed to the tool to form an interior chamber in the preform assembly for drawing a vacuum. A vacuum is created by the vacuum system in the interior chamber formed between the mold and the vacuum bag which draws the resin into the chamber, into the distribution medium layer, into the preform and finally into a resin trap during the VARTM process. During a typical the VARTM process, a low pressure to high pressure gradient is created between the resin inlets and the vacuum outlets. After the preform is fully impregnated as determined by sight or sensors, the resin with catalyst therein is allowed to cure either at room temperature or at an elevated temperature to accelerate the curing after which the vacuum bag, the distribution medium layer, the release film, and the preform are removed from the mold. At this point the preform with cured resin therein is ready for further manufacturing steps to produce a final structure, component, or device that may be used by itself or incorporated into another structure.

U.S. Pat. No. 4,902,215 by inventor Seemann, III, entitled "Plastic Transfer Molding Techniques for the Production of Fiber Reinforced Plastic Structures" discloses the VARTM process using a resin inlet being a line source and having a helical coil positioned on the top of the peel ply or release film. This speeds the resin flow to the preform. The vacuum outlet is a line outlet positioned around the circumference of the preform for drawing the resin through the preform from a resin inlet centrally located over the preform. Different distribution media are also shown that aid in the uniform distribution of resin into the preform.

U.S. Pat. No. 5,052,906 by inventor Seemann and having the same title as the above discloses a VARTM apparatus having multiple resin inlets and having a vacuum line source on the opposite side of the preform and further also having a distribution medium layer on the top and bottom of the preform. Various types of distribution medium layers are disclosed.

U.S. Pat. No. 5,316,462 by inventor Seemann entitled "Unitary Vacuum Bag for forming Fiber Reinforced Composite Articles" discloses a means of impregnating a fibrous preform by using a bag system with a resin distribution conduit and the distribution medium formed as an integral part of the vacuum bag. The distribution medium is formed as an integral part of the lower surface of the vacuum bag. A vacuum conduit runs around the circumference of the preform and is a part of the mold.

The following U.S. patents are incorporated by reference: U.S. Pat. Nos. 4,902,215; 5,052,906; 5,134,002; 5,226,997; 5,316,462; and 5,588,392.

Thus, there exists a need for an improved VARTM process and apparatus for providing a means for improved dimensional tolerances and strength by having an increased volume fraction of fibrous materials.

BRIEF SUMMARY OF THE INVENTION

The improved vacuum assisted resin transfer molding (VARTM) process and the apparatus for carrying out this improved process of the present invention provide products having improved dimensional tolerances and increased fiber volume fraction by the Removal of ACcumulated Excess Resin (RACER) process of the present invention.

In the improved VARTM process, the preform, the release film, the distribution medium layer, the resin inlet(s), the vacuum outlet(s), and the vacuum bag(s) are positioned on the mold. A first section of the vacuum line is connected onto the vacuum outlet(s) and onto a resin trap. A second section of the vacuum line is connected to a vacuum system from the resin trap. A resin line(s) is connected between the resin inlet(s) and the resin feed source(s). A crossover line is connected between the first section of the vacuum line and the resin line. Appropriate vacuum flow and resin flow control means are connected in the crossover lines. During resin impregnation, an on-off valve or clamp or the like is placed on the crossover line(s) so as to close it. After the resin has fully impregnated the preform by the conventional process, the crossover line(s) is opened and the resin line between a T-connector of the crossover line(s) and the resin feed source is closed. A vacuum is then applied to the crossover line(s) connected to the resin feed line(s) to begin the process of removal of the excess resin. Further, secondary vacuum outlets may be placed on the preform to aid in the removal of excess resin after resin impregnation. This further imposes a uniform vacuum pressure across the preform to improve the structural characteristics such as the fiber volume fraction and the compaction of the wetted preform over the conventional VARTM process.

Therefore, one aspect of the present embodiment is to provide an improved VARTM process.

Another aspect of the present embodiment is to provide an improved VARTM process for removing excess accumulated resin (RACER) from the preform.

A further aspect is to provide an improved VARTM process for imposing a uniform pressure across the preform to further compact the preform.

A still further aspect is to provide an improved VARTM process for increased fiber volume fraction in the final composite part.

And a still further aspect is to provide an improved VARTM process for manufacturing composite structures having improved dimensional tolerances.

And a still further aspect is to provide an improved VARTM process for the substantial elimination of voids and other structural defects to provide a composite structure of superior quality.

These and many other features and advantages of the present embodiment will be readily apparent to one skilled in the pertinent art from the following detailed description of a preferred embodiment of the invention and the related drawings.

DETAILED DESCRIPTION OF THE INVENTION

Figure 1:
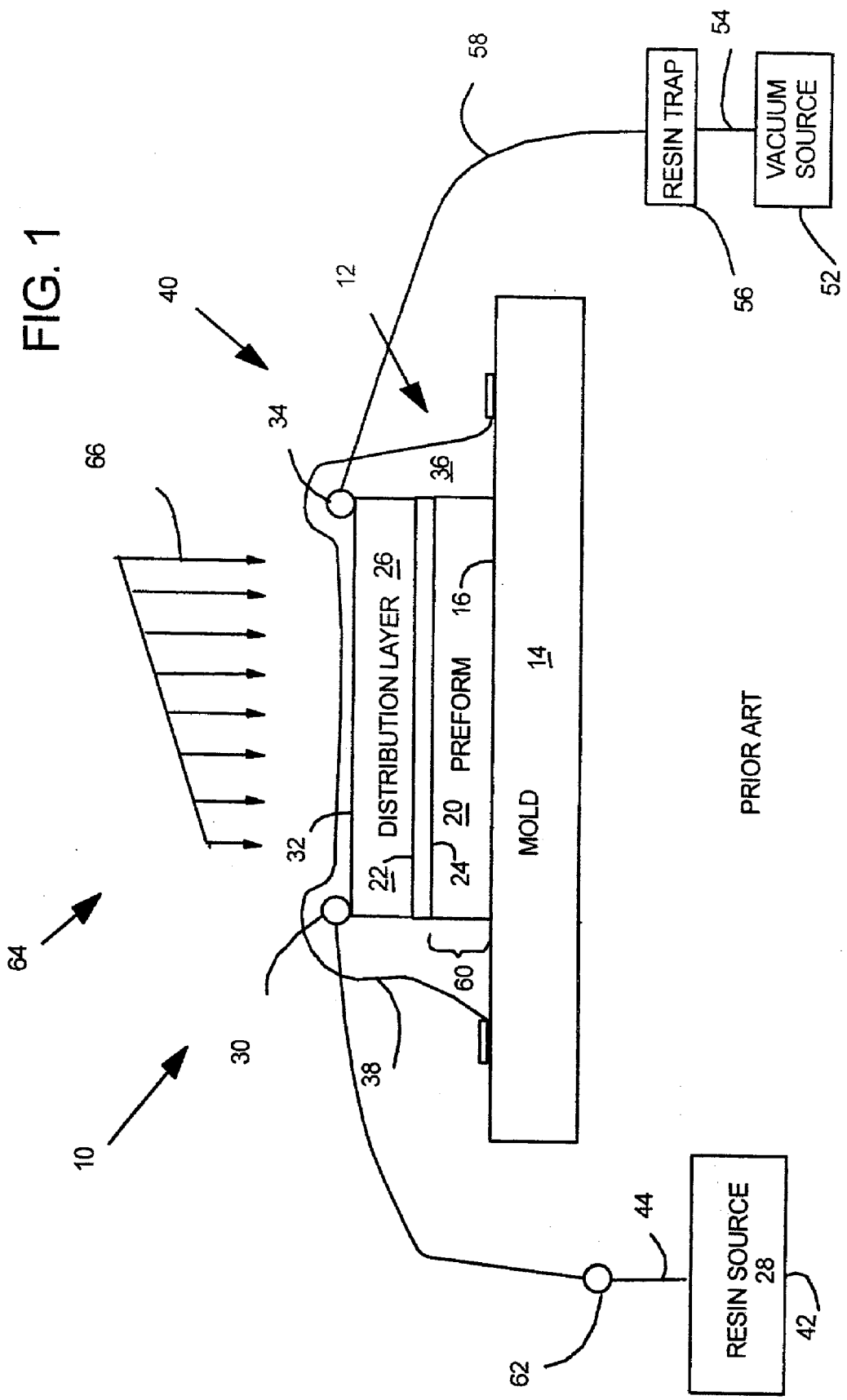
FIG. 1 is a schematic representation of a conventional VARTM apparatus with a pressure gradient shown across the top of the preform.

Referring to FIG. 1, the conventional Vacuum Assisted Resin Transfer Molding (VARTM) apparatus 10 for producing organic matrix fiber reinforced composite structures, components, or devices is illustrated by schematic view.

A composite structure 12, only partially shown, to be produced is formed on a substantially rigid tool or mold 14 made of appropriate mold material. The mold 14 may be coated with a release agent to further aid in the separation of the finished product. The composite structure 12 is formed to a desired shape such as may be obtained by a female mold having a surface 16 which replicates in shape a surface, not shown, of the desired finished product. FIG. 1, for example, illustrates a flat panel.

A dry fabric preform 20 of FIG. 1 is composed of layers of fabric patterns cut to desired shapes, not further shown. Each layer is stacked upon each other to yield a preform of desired thickness. The fabric materials are conventional, such as glass fibers, carbon or graphite fibers and aramid fibers and the like. The fibrous material used in the preform may have a number of configurations including, for example, random chopped fiber, continuous random fiber, and oriented continuous fiber, for example, non-woven, woven, knitted, braided, etc. The preform 20 of this material is normally directly laid up on the mold 14 having the interior surface 16.

After the preform 20 is positioned on the mold 14, a peel ply, peel sheet, release ply, or release film 22 is applied to a top surface 24 of the preform 20. The release film 22 being pervious to the type of resin being used. To further aid in the flow of resin, a resin distribution medium layer 26, being optional, may be placed on the release film 22 and is considered a conventional material such as shown in the above patents. The resin 28 being a generic expression herein, describes a variety of liquid materials used to impregnate the preform 20. The specific materials may be polyimides, bismaleimide, epoxies, polyesters, and phenolics, for example, having viscosities generally ranging from about 200 cps to about 1000 cps. The resin impregnated structure 12 may be cured by various conventional techniques either at room temperature or elevated temperatures.

The present invention discloses inputting a resin 28 into the preform 20 by vacuum. The resin 28 from a resin feed source 42 enters through one or more resin inlets 30, being in the present embodiment ends of plastic tubing, that are typically positioned on a top surface 32 of the distribution medium layer 26 so that the combination of vacuum and gravity draws the resin 28 into the preform 20. The placements of the resin inlets 30 is dependent on several factors such as the shape and contour of the preform, the distance to the vacuum outlets, and resin viscosity. The resin inlets 30 may be a "point" and/or "line" sources such as disclosed in the prior art. For example, the resin line may be connected to a open coiled spring, not shown, that was used in making the Example shown below.

One or more vacuum outlets 34 may be positioned on or adjacent the preform 20 and may be an integral part of the mold 14. The vacuum outlets 34 are typically placed at the last points of resin impregnation. The vacuum outlets 34 may also be "point" and/or "line" sources. The placement of the vacuum outlets 34 is dependent on several factors such as the shape, size, and contour of the preform 20 as well as the infusion pattern of the resin itself. In order to draw a vacuum on the preform, one or more vacuum bags are placed over the fabricated lay-up and sealed to the mold 14 in a conventional manner, for example, by tape.

From each resin feed source 42 runs one or more resin lines 44. Each resin inlet 30 has one resin line 44 connected thereto. Further, the resin 28 leaving the resin inlets 30 may further be assisted by a roller or squeegee action by a worker to insure quick application of the catalyzed resin, if so used.

In order to draw the resin 28 into the preform 20, a vacuum pump 52 is connected via a vacuum line 54 to a resin trap 56 and the resin trap 56 is connected to one or more vacuum outlets 34 via at least one or more vacuum lines 58.

In the VARTM process, the vacuum pump 52 draws a vacuum on the preform assembly 40 through the one or more vacuum outlets 34 and creates a sufficient negative pressure to draw the resin 28 which is at atmospheric pressure across the top surface 24 of the preform 20 and through the preform thickness 60. The resin 28 travels from the resin inlets 30 normally located on or near the top surface 24 of the preform 20 to the vacuum outlets. Once the preform 20 is fully impregnated with the resin 28, the process continues to draw out resin 28 through the vacuum outlets 34 into the resin trap 56 until the resin feed source 42 is turned off by a valve or clamp 62 on the flexible resin line 44. Not only does the negative pressure draw the resin out but further forces the vacuum bag 38 into the distribution medium layer 26 or directly onto the top 24 of the preform 20.

Due to the distance from the resin inlets 30 to the vacuum outlets 34, a negative pressure gradient 64 is created along the preform surface 24 where the full vacuum pressure is present at the vacuum outlets 34 and almost little or no pressure at the resin inlets 30. This is represented by the varying lengths of the vertical arrows 66 resulting in excess resin 28 accumulating on the top surface 24 and within the preform 20 further resulting in the preform 20 having less fiber volume fraction, poor dimensional tolerances, and poor structure characteristics caused by voids, etc.

Figure 2:
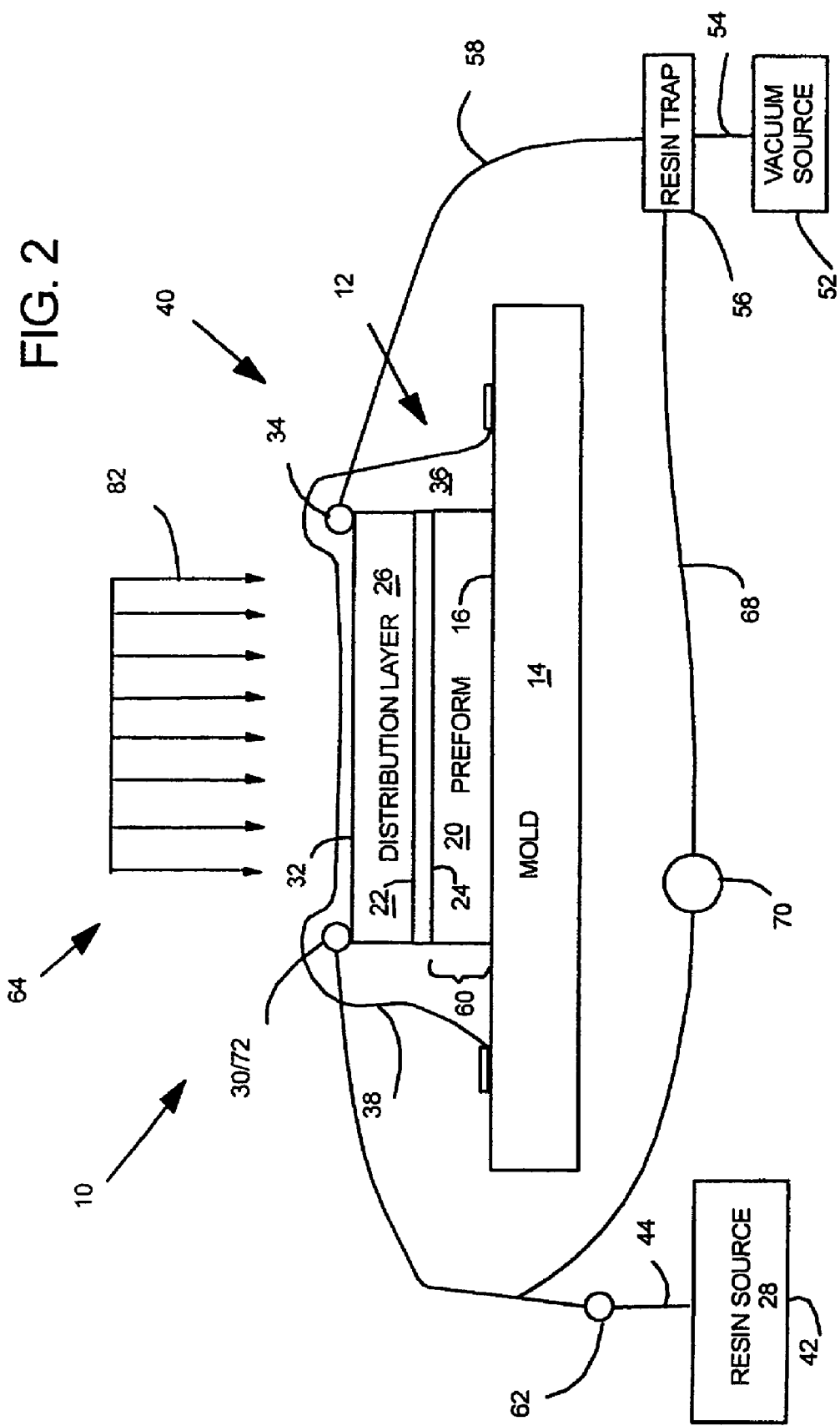
FIG. 2 is a schematic representation of the improved VARTM apparatus.

Referring to FIG. 2, one or more crossover lines 68 having flow control means such as an on-off valve 70, clamp, or equivalent is connected between the resin trap 56 and the resin lines 44. The connection to the resin lines 44 occurs between the resin inlets 30 and a flow control means such as the on-off valve/clamp 62. The connection into the resin line 44 by the crossover line 68 is by a T connector which may be a plastic polyethylene barbed T-connector that is sized for the flexible hose or tubing being used such as ⅜ inch or ½ inch id tubing.

In operation, during the step of drawing resin 28 into the preform 20, the vacuum valve 70 is closed in the crossover lines 68 and the resin valve/clamp 62 is opened. After the preform 20 is fully wetted, the resin valve/clamp 62 is closed and the vacuum valve 70 is opened. In effect, one or more of the resin inlets 30 are converted into a vacuum/resin outlet 72. The excess resin is thus also removed by the now converted resin outlets 30 to vacuum/resin outlets 72. These vacuum/resin outlets may be termed excess resin outlets also. As a result of having two or more vacuum outlets, the negative pressure gradient 64, not to scale, between the vacuum outlets 34 and the vacuum/resin outlets 72, is essentially removed placing a uniform negative pressure across the top surface 24 of the preform 20 as illustrated by the vertical arrows 82 having a uniform vertical length. The improved VARTM process removes excess accumulated resin because of the overall increased vacuum pressure, thereby resulting in the improved preform compaction by the vacuum bag(s) and reduced variations in the thickness. Thus, the composite structure will have a more uniform thickness, due to more uniform vacuum application and increased average fiber volume fraction, $V_f$, due to better compaction.

Figure 3:
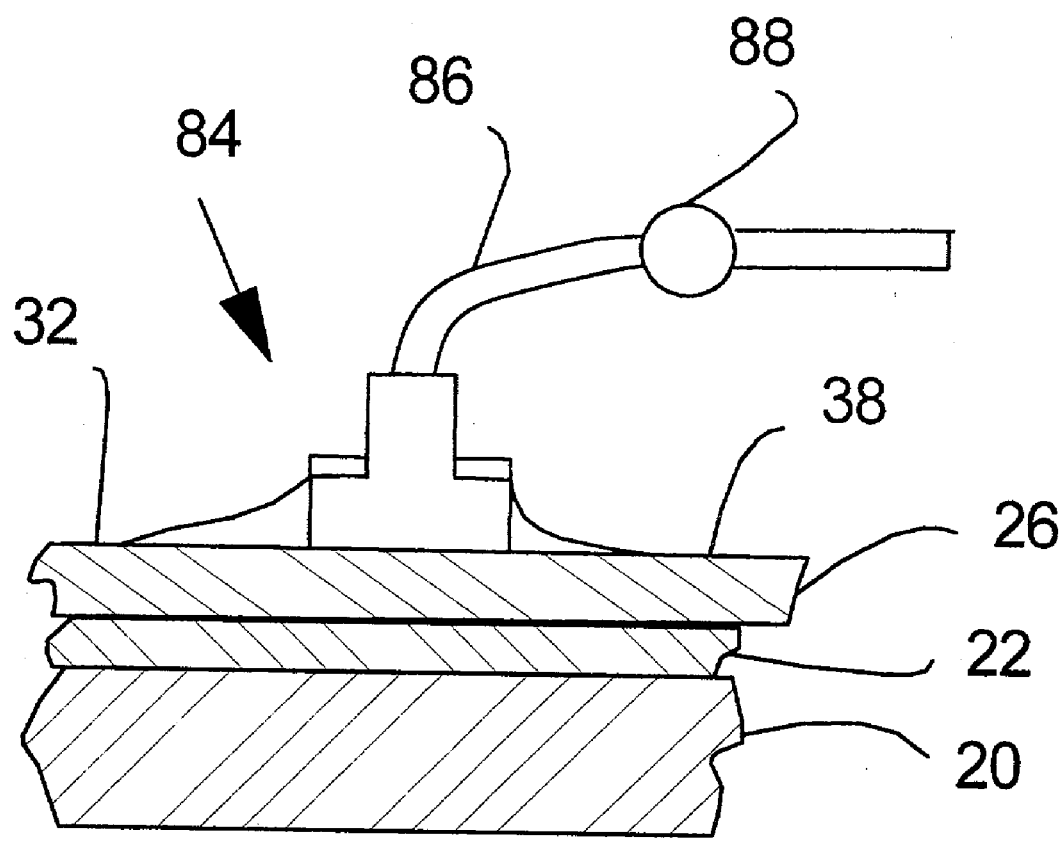
FIG. 3 is a secondary vacuum outlet positioned on the preform.

To provide additional vacuum outlets to the preform after resin impregnation, one or more secondary vacuum outlets 84, FIG. 3, may be positioned on the top surface 32 of the distribution medium layer 26, for example, and connected through the vacuum bag 38 to a vacuum line 86 with a flow control means 88 therein. After the flow of resin 28 from the resin feed source 42 has been stopped, the vacuum is applied to the secondary vacuum outlets 84 to also remove excess accumulated resin. The secondary vacuum outlets 84 may be in addition to the resin inlets 30 that have been converted into vacuum/resin outlets 72.

Figure 4:
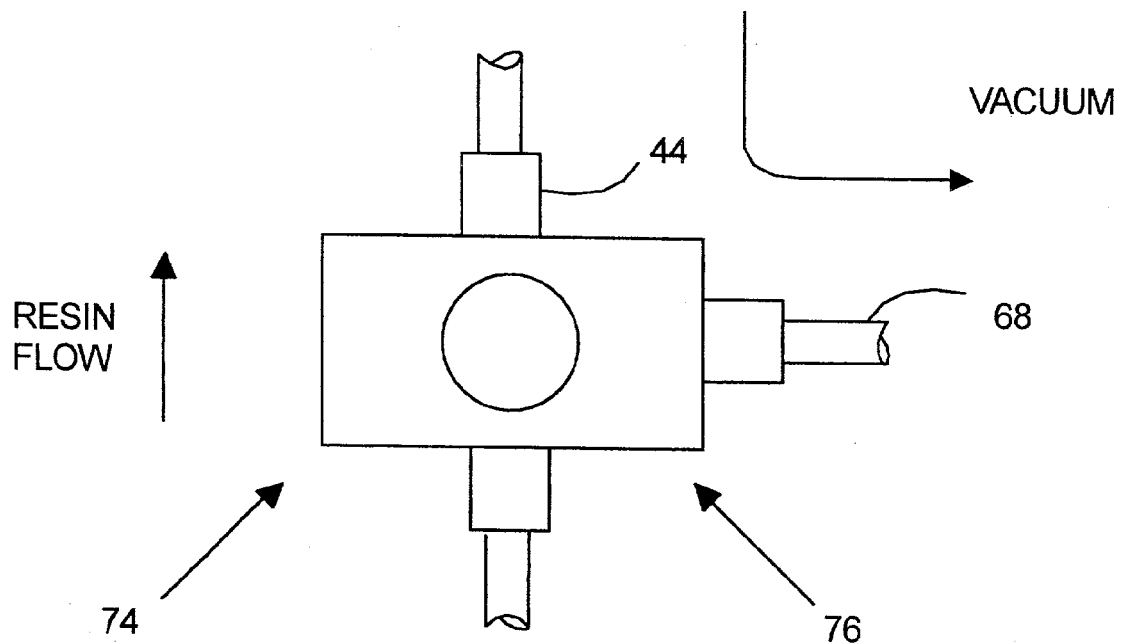
FIG. 4 is an example flow control device.

Instead of using clamps to act as the on-off valves 62/70/88, and to reduce the steps in connecting the various lines, a two-way valve 74 can be used as shown in FIG. 4 which has a manual stop cock 76. This can reduce the number of cut lines to one per converted resin outlet 34 if there is one resin line 44 per resin outlet. The presence of catalyzed resin in the valves would normally require that the valves be discarded after use thus increasing the cost. In the preferred embodiment, manual clamps of conventional design are applied to the flexible tubing which is used for both the resin lines and the vacuum lines.

Figure 5:
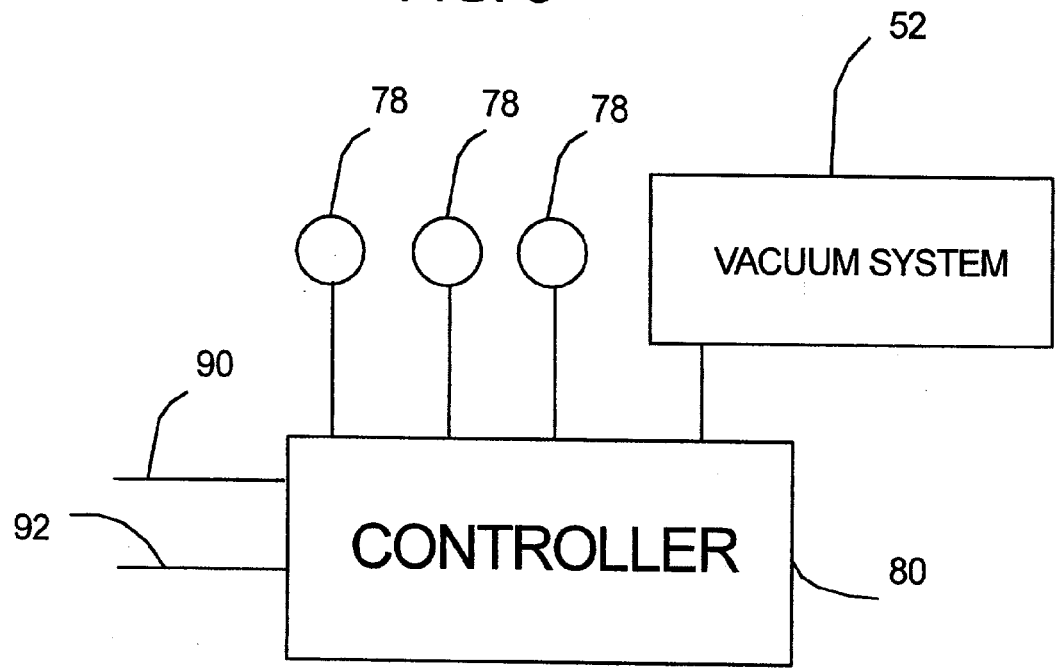
FIG. 5 is a schematic of the improved VARTM using a programmable computer controller for operating various valves, vacuum line valves and resin line valves, with associated vacuum lines.

A further improvement would be the automation of the improved VARTM process by use of a programmable controller 80, FIG. 5, that may be connected to the vacuum pump 52, connected to the electro-mechanical valves 78 that are placed in the various resin/vacuum lines replacing the mechanical on-off valves 74 or clamps. The controller 80 would be programmed to control the closing and opening of the various valves and the vacuum pump 52.

As is in most VARTM processing methods, once the preform 20 is fully infused with the resin 28, the resin feed source 42 is shut off and additional resin 28 does not flow into the preform 20. At that time in the process, there is little or no vacuum pressure at or near the resin inlets 30 since the vacuum pressure tends to drop off significantly the greater the distance from the vacuum outlets 34. In the improved VARTM process, the resin inlets 30 are converted into vacuum sources as soon as the preform 20 is completely impregnated with resin 28. It is further possible to add additional vacuum outlets about the preform 20 top surface which are opened after the resin has been fully impregnated the preform for increased resin removal and preform compaction. The improved VARTM process enables an even distribution of pressure over the entire resin impregnated preform 20 which results in improved dimensional tolerances and higher fiber volume fraction, $V_f$. By eliminating the pressure gradients between the conventional resin inlets and the vacuum outlets, the impregnated preform will no longer exhibit a difference in thickness between the vacuum outlets and the resin inlets. Another inherent benefit of this process is the removal of excess resin especially at or near the resin inlets and/or the vacuum outlets on the top surface of the preform. This will result in a composite structure with a more uniform thickness and an increased average fiber volume fraction.

EXAMPLE

Experiments using this process have shown, (see Table 1) that a composite structure manufactured using this process has improved dimensional tolerances through the thickness measurements with an average $V_f$ increase of from about 10 to about 20 percent over the conventional VARTM process. The average thickness of the composite structure manufactured using the improved VARTM process is less than the conventional VARTM process with a smaller standard deviation in the measured thickness.

Fabric used: S2 glass 24 oz/yd$^2$, 5×5 woven roving, 22 plies.

Resin used: Epoxy, SC-15, manufactured by Applied Poleramic.

Distribution medium: 50% shade awning material.

Release film: (between preform and distribution medium) standard industry peel ply.

TABLE 1

Comparison of Improved VARTM and Conventional VARTM Processes

| | $V_f$% | STDEV | Thickness(in) | STDEV |
|---|---|---|---|---|
| Improved VARTM | 60 | 1.5 | 0.524 | 0.0048 |
| Conventional VARTM | 53 | 1.5 | 0.536 | 0.0186 |

Clearly many modifications and variations of the present invention are possible in light of the above teachings and it is therefore understood, that within the inventive scope of the inventive concept, that the invention may be practiced otherwise than specifically claimed.

What is claimed is:

1. A process for forming a fiber reinforced composite structure comprising the steps of:
   providing a mold having a surface upon which the composite structure is formed;
   placing a preform upon the mold surface;
   positioning at least one resin inlet proximate the preform;
   positioning at least one vacuum outlet proximate the preform;
   placing at least one vacuum bag over the preform and sealing the vacuum bag to the mold to form a preform assembly, having at least one resin inlet allowing resin to flow therethrough;
   positioning a means for removing excess resin proximate the preform and further imposing a substantially uniform pressure along the preform;
   connecting a vacuum system to the at least one vacuum outlet by a vacuum line and drawing a vacuum upon the perform assembly and to the means for removing excess resin;
   applying resin from the resin feed source through the at least one resin inlet into the preform assembly to fully impregnate the preform;
   stopping the flow of resin from the resin inlet;
   applying a vacuum to the perform assembly through the resin inlet, and through at least one vacuum outlet, and through the means for removing excess resin allowing for a sufficient time to remove excess accumulated resin and to compact the fully impregnated preform with a substantially uniform pressure thereover to provide for improved dimensional tolerances and increased fiber volume fraction in the structure;
   curing the resin in the fully impregnated preform; and
   removing the cured preform being the fiber reinforced composite structure from the mold.

2. A process for forming a fiber reinforced composite structure as defined in claim 1 wherein the means for removing excess resin comprises a plurality of vacuum outlets attached to the preform assembly and positioned relative to the preform assembly and to each other to reduce variations in preform thickness by optimizing pressure variations by reducing the distances between the excess resin outlets and the vacuum outlets.

3. A process for forming a fiber reinforced composite structure as defined in claim 1 wherein the vacuum to the at least one vacuum outlet and to the at least one excess resin outlet is applied a sufficient time to reduce variations in part thickness of the composite structure.

4. A process for forming a fiber reinforced composite structure as defined in claim 1 wherein the vacuum is applied to at least one vacuum outlet and to at least one excess resin outlet and is applied for a sufficient time to further improved fiber volume up to 60 percent or more.

5. A process for forming a fiber reinforced composite structure as defined in claim 1 where in the vacuum to the at least one vacuum outlet and to the at least one excess resin outlet is applied a sufficient time to further improve both the fiber volume fraction from up to 60 percent or more and to reduce variations in part thickness of the composite structure.

6. A process for forming a fiber reinforced composite structure as defined in claim 2 further including the application of a release film to the preform.

7. A process for forming a fiber reinforced composite structure as defined in claim 2 further including the application of at least one distribution medium layer to the preform.

* * * * *